US012776689B2

(12) United States Patent
Metz

(10) Patent No.: US 12,776,689 B2
(45) Date of Patent: Oct. 27, 2026

(54) ELECTRIC MOTOR ARRANGEMENT

(71) Applicant: BorgWarner Inc., Auburn Hills, MI (US)

(72) Inventor: Dietmar Metz, Meckenheim (DE)

(73) Assignee: BORGWARNER INC., Auburn Hills, MI (US)

( * ) Notice: Subject to any disclaimer, the term of this patent is extended or adjusted under 35 U.S.C. 154(b) by 181 days.

(21) Appl. No.: 18/406,477

(22) Filed: Jan. 8, 2024

(65) Prior Publication Data

US 2025/0167637 A1 May 22, 2025

(30) Foreign Application Priority Data

Nov. 20, 2023 (DE) ......................... 102023132281.8

(51) Int. Cl.
*H02K 11/215* (2016.01)

(52) U.S. Cl.
CPC ........ *H02K 11/215* (2016.01); *H02K 2211/03* (2013.01)

(58) Field of Classification Search
CPC ...... H02K 11/215; H02K 29/08; H02K 11/33; H02K 11/30; H02K 2211/03; H02K 5/225; H02K 5/10; H02K 1/187
USPC .................................................. 310/68 B, 71
See application file for complete search history.

(56) References Cited

U.S. PATENT DOCUMENTS 6,545,462 B2 4/2003 Schott et al.
7,489,127 B2 2/2009 Bauer et al.
2002/0153794 A1* 10/2002 Kawasaki .............. H02K 7/083 310/156.08
2010/0321006 A1* 12/2010 Suzuki ................. H02K 11/215 324/207.25
2013/0026888 A1* 1/2013 Migita .................. H02K 29/08 310/68 B (Continued)

FOREIGN PATENT DOCUMENTS

EP 1182461 A2 2/2002
WO 2019001629 A1 1/2019

OTHER PUBLICATIONS

English language abstract for EP 1 182 461 A2 extracted from espacenet.com database on Jan. 8, 2024, 2 pages.

(Continued)

*Primary Examiner* — Alexander A Singh
(74) *Attorney, Agent, or Firm* — Howard & Howard Attorneys PLLC

(57) ABSTRACT

An electric motor arrangement (1) includes an electric motor (5), which includes a rotor (9), having a sensor arrangement (31) for detecting an angular position of the rotor (9), which includes a magnet (27) and a magnetic field sensor apparatus (29). The arrangement (1) also includes a housing (19), which has a rotor region (13), in which the rotor (9) is arranged, and a circuit region (15), which is spatially separated from the rotor region (13) by a housing wall (19) and in which the magnetic field sensor apparatus (29) is arranged. The rotor (9) includes an end region (23), facing the housing wall (19), containing the magnet (27). The magnetic field sensor apparatus (29) is configured to detect a magnetic field of the magnet (27) that penetrates the housing wall (19) and to provide angular position information about the angular position of the rotor (9).

20 Claims, 2 Drawing Sheets

(56) References Cited

U.S. PATENT DOCUMENTS

2016/0181885 A1* 6/2016 Yamasaki .............. H02K 5/225
180/443
2023/0261544 A1* 8/2023 Kim ..................... H02K 7/1166
310/83

OTHER PUBLICATIONS

English language abstract and machine-assisted English translation for WO 2019/001629 A1 extracted from espacenet.com database on Jan. 8, 2024, 9 pages.

* cited by examiner

ELECTRIC MOTOR ARRANGEMENT

CROSS-REFERENCE TO RELATED APPLICATIONS

This application claims priority pursuant to 35 U.S.C. 119(a) to German Patent Application No. 102023132281.8 filed Nov. 20, 2023, which application is incorporated herein by reference in its entirety.

BACKGROUND

The invention relates to an electric motor arrangement having a sensor arrangement for detecting an angular position of a rotor of an electric motor.

An electric motor comprises a nonrotating stator and a rotating rotor, both of which have magnetic regions. The rotor may be an internal rotor that is driven in the stator. Alternatively, the rotor may be an external rotor that rotates, and is driven, around the stator. The interaction between magnetic fields of the magnetic regions causes the rotor to rotate. The stator has stator coils that produce a time-variant magnetic field as magnetic regions on the basis of a flow of current through the stator coils. A commutation of the stator coils, that is to say the control of energization phases for the stator coils, may be optimized by way of attitude information about the rotor, and so the stator coils, which are energized on the basis of time, and the magnetic regions of the rotor are aligned with one another during operation in such a way that the performance of the electric motor is optimized.

During operation, the rotor attitude may be detected using sensorless methods, e.g. by way of a software-based analysis of current and voltage, but this works only when the rotor is rotating.

Conventional angle detection may also be performed by means of an encoder, the cable connection of which is routed for example through the electric motor and via LV connectors to power electronics for controlling the electric motor. Injection methods for angle detection involve the initial position of a rotor being estimated by monitoring detected motor current signals in response to the supply of an injection signal. This approach may be used for electrically driven turbochargers, for example, which are operated at low speed on startup.

EP 1 182 461 A2 shows a sensor for detecting the direction of a magnetic field. It comprises a single magnetic field concentrator, having a two-dimensional shape, and at least a first horizontal Hall element and a second horizontal Hall element, the Hall elements being arranged in the region of the edge of the magnetic field concentrator. The magnetic field concentrator alters the course of the field lines of the magnetic field in its environment and, in particular, causes the field lines, which would run parallel to the surface of the Hall elements in the absence of the magnetic field concentrator, to penetrate the Hall elements approximately perpendicularly to their surface. Instead of the horizontal Hall elements, vertical Hall elements may also be used if they are arranged beside the magnetic field concentrator. The sensor is particularly suitable as an angle sensor.

WO 2019/001629 A1 shows a method for adjusting a position of a magnet in relation to a GMR sensor that is used to infer a position of the rotor by way of an evaluation unit from a variable magnetic field produced by the magnet mounted on a rotor of a drive unit. A method in which high-precision signal output from the GMR sensor is possible involves an optimum operating range of the GMR sensor being derived from a direction and/or rotation of a magnetic vector sum for the magnetic field defined by the magnet, by measuring a magnetic field strength in a plane defined by the vector sum using a second magnetic field sensor.

U.S. Pat. No. 7,489,127 B2 shows a measuring system for contactlessly measuring a rotation angle using a first body, on which at least one magnet is arranged, and using at least one element sensitive to magnetic fields, which is supported by a second body, for generating a measurement signal, the first body and the second body being rotatable relative to one another about a rotation axis, and the magnet having a recess of the blind-hole type. At least part of the at least one magnetically sensitive element projects into the recess.

SUMMARY

The object is to specify an alternative approach to detecting the rotor attitude that may also be used to detect the attitude of the rotor at rest.

The object is achieved by an electric motor arrangement having the features of claim 1.

There is provision for the electric motor arrangement to have an electric motor, which comprises a rotor, having a sensor arrangement for detecting an angular position of the rotor, which comprises a magnet and a magnetic field sensor apparatus, and having a housing, which has a rotor region, in which the rotor is arranged, and a circuit region, which is spatially separated from the rotor region by a housing wall and in which the magnetic field sensor apparatus is arranged. The rotor comprises an end region, facing the housing wall, containing the magnet, and the magnetic field sensor apparatus is designed to detect a magnetic field of the magnet that penetrates the housing wall and to provide angular position information about the angular position of the rotor.

Besides the rotor, the electric motor also comprises a stator having stator coils. The angular position, as the rotational position of the rotor, indicates the attitude of the rotatable rotor. The angular position is the angle between a predefined point on the rotor and a predefined point in the surroundings, in particular referenced to the stator. The angular position may be used to infer how the magnetic regions of the rotor are aligned relative to coils of a stator. The control of the energization phases of the coils is based on the detected angular position of the rotor and is able to be optimized on the basis of the angular position information provided by the sensor arrangement, with the result that the time-dependent magnetic field induced in the stator coils and the rotor are in or strive for a predefined alignment with one another during operation. The electric motor may be controlled by a control circuit.

The sensor apparatus comprises a magnet that is connected to the rotor in a rotationally fixed manner and rotates therewith, and the magnetic field of which is able to be detected by the magnetic field sensor arrangement arranged on the other side of the rotor, which means that it does not rotate with the rotor. The detected magnetic field orientation relative to the magnetic field sensor arrangement corresponds to the angular position of the rotor, and so angular position information dependent on the detected magnetic field indicates the angular position of the rotor. By way of example, such angular position information may be a voltage value that is dependent on the magnetic field orientation and thus on the angular position, or may be transmitted digitally.

The magnet and the magnetic field sensor arrangement are spatially separated from one another by the housing wall.

The magnet is arranged in the rotor region. The rotor region is a region of the housing in which the rotor is arranged. The stator may also be arranged in this region. The magnetic field sensor arrangement is arranged in the circuit region provided for the electronics. In the simplest case, these may comprise only the magnetic field sensor arrangement. There is normally also provision in the circuit region for a control circuit for the electric motor. The rotor region and the circuit region do not necessarily have to be spaces that are completely or largely enclosed by the housing, but rather these regions are defined by the housing wall that separates them.

In contrast to sensorless approaches to detecting angular position, the electric motor arrangement has provision for the sensor arrangement. The sensor arrangement is designed to detect the angular position by way of the magnetic field that penetrates the housing wall, as the partition wall between the electric motor and the circuit region as the electronics region, even when the rotor is at rest. The ascertained angular position information allows the electric motor to be controlled in such a way that the full torque may already be achieved on startup, even at 0 revolutions/min. Startup may therefore require a smaller current and result in greater efficiency being achieved. The electric motor arrangement described is robust and inexpensive. The electric motor arrangement may be used for torque-dependent electric motor applications at low speed, e.g. for auxiliary units. This approach affords an advantage in particular for electric motor applications having a high torque requirement at low speeds.

In comparison with sensorless systems, the detection and processing of the detected signal requires less complexity and lower costs for a microcontroller provided for controlling the electric motor on the basis of angular position. Cheaper current measurement is facilitated.

In one embodiment, the magnetic field sensor apparatus comprises at least two Hall sensors designed to detect the magnetic field of the magnet that penetrates the housing wall. A current-carrying Hall sensor delivers an output voltage proportional to the vector product of magnetic flux density and current.

The rotor comprises the rotating components and, in one embodiment, may have an external rotor that rotates, and is driven, around the outside of the stator. The end region in which the magnet is arranged is a region on the end face, radially spaced rotor regions nevertheless still being able to extend beyond the end region containing the magnet. In one embodiment, the rotor comprises a rotor shaft on the end face of which the magnet is arranged. Nevertheless, the external rotor may extend beyond the end region on the rotor shaft, containing the magnet, in the axial direction, and so the end region containing the magnet does not necessarily have to be the widest axial extent of the rotor. The magnet is connected to the rotor shaft in a rotationally fixed manner, which means that it rotates with the rotor shaft and the magnetic field may be used to detect the angular position. Such a connection may be made by adhesive bonding, clamping or screwing, for example. With the arrangement on the end face, the magnet faces the housing wall and may be positioned at a short distance from the magnetic field sensor apparatus.

In one embodiment, the rotor comprises a disk rotor. The rotor is advantageously disk-shaped.

In one embodiment, the housing wall that the magnetic field penetrates comprises aluminum. Aluminum is lightweight and therefore very suitable for the housing.

The housing wall separates the rotor region and the circuit region, in which essentially the electronics are arranged, from one another. The circuit region is advantageously separated from the rotor region in a liquid-tight manner, which means that contaminants and water ingress, which could have adverse effects in the circuit region, are avoided. The housing wall spatially separates the magnetic field sensor apparatus and the magnet from one another. They are arranged on opposite sides of the housing wall, the magnet advantageously not touching the housing wall, but the magnetic field sensor apparatus being able to be mounted on the housing wall. In one embodiment, the magnetic field sensor arrangement and the magnet are arranged on a rotation axis of the rotor. This arrangement of the magnet prevents an imbalance in the rotor.

The magnet in the form of a permanent magnet requires no supply of electrical power, and so the supply of electrical power to and control of the sensor arrangement are provided only for the magnetic field sensor apparatus, and effected in particular by the circuit region. Supply of power and control by the rotor region and hence possible interactions with the rotor and the stator during operation are avoided. It is therefore not necessary to route wires for the sensor arrangement into the rotor region, which wires would need to be sealed.

A control circuit for the electric motor is advantageously designed to control a commutation of the electric motor on the basis of the angular position information. For this purpose, the magnetic field sensor apparatus has provision for an interface to the control circuit. The magnetic field sensor apparatus and the control circuit may be in the form of separate modules or integrated. The latter is integrated power electronics with an angle sensor in particular for commutation at low rotation speeds.

In one embodiment, the Hall sensors are arranged on a separate printed circuit board. A control circuit for controlling the electric motor is arranged on a further printed circuit board in the circuit region and electrically conductively connected to the magnetic field sensor apparatus. The provision of a separate printed circuit board, the size of which merely needs to be sufficient to receive and make contact with the magnetic field sensor apparatus, allows many degrees of freedom when arranging this printed circuit board close to the housing wall in order to optimize the distance of the Hall sensors from the magnet for magnetic field detection. By way of example, the printed circuit board may be arranged on a base on the further printed circuit board, on the back of the housing wall or in a receiving apparatus of the housing for the printed circuit board. Arranging the sensor on a separate small printed circuit board allows the field-sensitive sensor electronics to be positioned as close as possible to the magnet that indicates the attitude of the rotor. Insulation requirements may also be better met with a separate printed circuit board for the sensor. In an alternative embodiment, the magnetic field sensor apparatus and the control circuit are arranged on the same printed circuit board.

In one embodiment, the control circuit comprises a high-voltage region and/or a high-current region, the distance of which from the magnet, and hence the housing wall, is greater than the distance of the magnetic field sensor apparatus from the magnet. This may be achieved for two printed circuit boards by virtue of the printed circuit board with the magnetic field sensor apparatus being arranged closer to the housing wall and hence to the magnet than the printed circuit board with the control circuit.

In one embodiment, the magnetic field sensor apparatus is at a shorter radial distance from a rotation axis of the rotor than the high-voltage region and/or the high-current region.

The magnetic field sensor apparatus is therefore placed closer to the magnet than the high-voltage region and/or high-current region in a peripheral region on the printed circuit board.

In one embodiment, control of and supply of power to the sensor arrangement may be effected at least in part by way of electrical contacts for externally supplying power to the whole electric motor arrangement, to which contacts the magnetic field sensor apparatus is electrically conductively connected. An electrically conductive connection such as this may comprise a cable.

BRIEF DESCRIPTION OF THE DRAWINGS

Some exemplary embodiments are explained in more detail below with reference to the drawings, in which.

DETAILED DESCRIPTION

In the Figures, components that are identical or have an identical functional effect are provided with the same reference signs.

Figure 1:
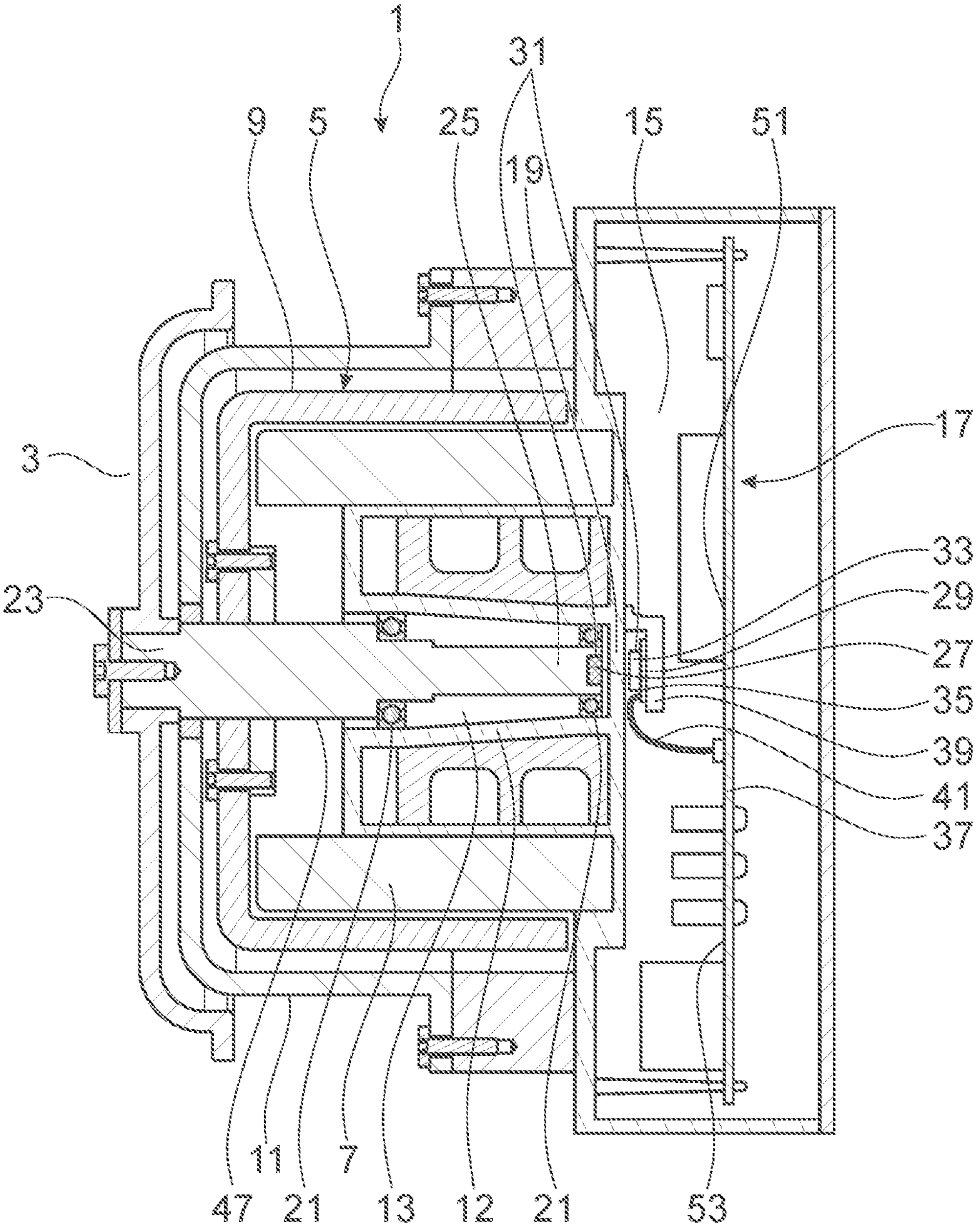
FIG. 1 shows a schematic sectional representation through an exemplary embodiment of an electric motor arrangement for a fan.

FIG. 1 shows a schematic sectional representation through an exemplary embodiment of an electric motor arrangement 1 for a fan, the front of which has a fan wheel adapter 3 arranged on it. A fan wheel (not shown in FIG. 1) may be installed on the fan wheel adapter 3. Such a fan may be used for example for cooling in E-vehicles that are battery or fuel-cell operated. Alternative areas of use are conceivable for driving auxiliary units in vehicles.

The electric motor 5 of the electric motor arrangement 1 comprises a stator 7 and a rotatable rotor 9, which comprises a bell-shaped external rotor and a rotor shaft 47. The external rotor is arranged on the rotor shaft 47, which extends in the stator 7, in a rotationally fixed manner. The rotor 9 and the stator 7 are arranged in a multipartite housing 11.

The housing 11 comprises a rotor region 13, in which the rotor 9 is arranged, and a circuit region 15, in which a control circuit 17 for supplying power to and controlling the electric motor 5 is arranged. The rotor region 13 comprises a tub-shaped housing part 12, part of which extends between the rotor shaft 47 and the stator 7. The circuit region 15 is a housing chamber on the side of the housing 11 that is remote from the fan wheel adapter 3. Arranged between the rotor region 13 and the circuit region 15 is a housing wall 19 made from aluminum or an alloy comprising aluminum, which separates the two regions 13, 15 from one another. In this exemplary embodiment, the housing wall 19 is a bottom region of the tub-shaped housing part 12.

The circuit region 15 is a cavity that is separated from the rotor region 13 in a liquid-tight, in particular watertight, manner. The liquid-tight seal prevents the infiltration of gas conveyed by the fan and also dirt and liquid, which thus cannot interact with the electrical components arranged in the circuit region 15, which means that the risk of failure of the components is reduced and the ageing thereof is slowed.

The rotor 9 is rotatably mounted in the housing 11 by way of multiple bearings 21. The bearings 21 are arranged between the tub-shaped housing part 12 and the rotor shaft 47. A first end region 23 of the rotor shaft 47 protrudes from the housing 11 and is connected to the fan wheel adapter 3 in a rotationally fixed manner, which means that a rotation of the rotor 9 is transmitted to the fan wheel adapter 3. A second end region 25 of the rotor shaft 47, which is opposite the first end region 23, faces the housing wall 19 that separates the rotor region 13 from the circuit region 15.

The rotor 9 comprises not only magnetic regions on the bell-shaped external rotor but also the rotor shaft 47, the end face of which, as the end region of the rotor 9, has a magnet 27 arranged on it, the magnet 27 being connected to the rotor shaft 47 in a rotationally fixed manner. The magnet 27 is arranged on the second end region 25, which faces the housing wall 19. In this exemplary embodiment, the magnet 27 is arranged in a depression in the end face of the rotor shaft 47. The magnet 27 is a permanent magnet.

Arranged in the circuit region 15 is a magnetic field sensor apparatus 29 for detecting an angular position of the rotor 9. The magnetic field sensor apparatus 29 is designed to detect a magnetic field of the magnet 27 that penetrates the housing wall 19 and to provide angular position information regarding the rotor 9.

The magnet 27 and the magnetic field sensor apparatus 29 form a sensor arrangement 31 that is arranged on both sides of the housing wall 19 and allows angular position detection by the housing wall 19 by detecting the magnetic field that penetrates the housing wall. The housing wall 19 comprises aluminum or an aluminum alloy. Its thickness, its material and the distance between the magnet 27 and the magnetic field sensor apparatus 29 are chosen such that the magnetic field may penetrate the housing wall 19 and is able to be detected with sufficient accuracy to determine the angular position. A typical distance is in the region of 5 mm.

The magnetic field sensor apparatus 29 comprises at least one Hall sensor 33, which has a semiconductor layer. There is advantageously provision for at least two Hall sensors 33. Providing further Hall sensors 33 increases the precision. When supplied with current, the Hall sensor 33 delivers an output voltage that is proportional to the absolute value of the vector product of the magnetic flux density of the magnetic field flowing through the semiconductor layer and the current. This allows the angular position of the magnet 27 to be determined, which corresponds to the angular position of the rotor 9. The angular position is also detectable by this sensor arrangement 31 when the rotor is at rest.

The magnetic field sensor apparatus 29 comprises a printed circuit board 35 on which the Hall sensors 33 are arranged and by way of which the Hall sensors 33 are controlled, supplied with power and the output variable thereof is provided as angular position information. The printed circuit board 35 is arranged in a bowl-shaped receptacle 39 on the housing wall 19, and so the Hall sensors 33 are positioned adjacently to the magnet 27 on the other side of the housing wall 19 and the distance is suitable for magnetic field detection. The magnetic field sensor apparatus 29 can be fixed by adhesive bonding or screwing, for example. In this exemplary embodiment, both the magnetic field sensor apparatus 29 with the Hall sensors 33 and the magnet 27 are arranged on the rotation axis of the rotor 9. A cable connection 41 electrically conductively connects the Hall sensors 33 to a control circuit 17 for the electric motor 5 in the circuit region 15. The control circuit 17 is disposed on a further printed circuit board 37. It comprises multiple electrical components arranged on the further printed circuit board 37, among other things a microcontroller, for controlling and supplying power to the electric motor 5. The cable connection 41 is used to control the Hall sensors 33 by way of the control circuit 17, to supply them with power and to provide the control circuit with its output variable. The microcontroller of the control circuit 17 controls the commutation of the electric motor 5 on the basis of the angular position information provided by the magnetic field sensor apparatus 29.

Alternatively, the magnetic field sensor apparatus 29 with the Hall sensors 33 may also be arranged on the same printed circuit board 37 as the control circuit 17. In one exemplary embodiment, the Hall sensors 33 are arranged on a separate printed circuit board 35, which is arranged on a base on the printed circuit board 37 of the control circuit 17. The base also provides the electrical connection. The base allows the Hall sensors 33 to be placed sufficiently close to the housing wall 19 and to the magnet 27 and thus allows angular position detection to be performed.

In this exemplary embodiment, the control circuit 17 has a high-current region 53 that is arranged at a distance from the magnetic field sensor apparatus 29 so as not to influence, or to only slightly influence, the measurement.

Current itself generates magnetic fields that would interfere with the measurement of the magnetic field sensor apparatus 29. The Hall sensors 33 should be positioned as close as possible to the housing wall 19 in order to have the field of the magnet 27 pass through them as strongly as possible. A high-voltage region requires more distance from the housing wall 19 for reasons relating to insulation. However, this distance would be too great for the magnetic field sensor apparatus 29 with its Hall sensors 33. The magnetic field sensor apparatus 29 is therefore at a distance from the printed circuit board 37 and closer to the housing wall 19. For reasons relating to current, a lateral distance for a high-current region 53 would also suffice, since the distance thereof from the housing wall is not as critical.

An alternative approach is a dome-shaped protuberance from the housing wall in the direction of the printed circuit board 37, into which the rotor shaft 47 with the magnet 27 projects, which means that the magnet is positioned sufficiently close to the magnetic field sensor apparatus 29 on the printed circuit board 37. However, for reasons relating to voltage and current, a sufficient lateral distance from the high-voltage region and the high-current region on the printed circuit board 37 to the protuberant housing wall and the magnetic field sensor apparatus 29 is then required. The magnetic field sensor apparatus 29 may be provided in a, in particular central, region on the printed circuit board 37 that is at a shorter distance from the magnet 27 than a, in particular peripheral, region on the same printed circuit board 37 in which the high-voltage region 53 is arranged.

The spacing may be achieved by arranging the magnetic field sensor apparatus 29 and the high-voltage region 53 on different printed circuit boards, as shown in FIG. 1. The magnetic field sensor apparatus 29, at a shorter distance from the magnet 27, is arranged closer to the housing wall 19 than the high-voltage region 53.

Another option for placing the magnetic field sensor apparatus 29 closer to the magnet 27 may be achieved by way of a base on the printed circuit board.

Nevertheless, there may also be provision on the printed circuit board with the high-voltage region 53 for a low-voltage region 51, the distance of which from the magnet 27 is shorter than that of the high-voltage region 53. By way of example, the magnetic field sensor apparatus 29 and the low-voltage region 51 may be arranged centrally on the printed circuit board 37. The same applies to the provision of a low-current region. The approaches are combinable.

The supply of electrical power to and control of the sensor arrangement 31 are focused on the magnetic field sensor apparatus 29 in the circuit region 15. A supply of electrical power to and control of the Hall sensors 33 is not effected by the rotor region 9. The magnet 27 is installed wirelessly. It requires no electrical connection and, as a permanent magnet, requires no supply of electrical power.

Figure 2:
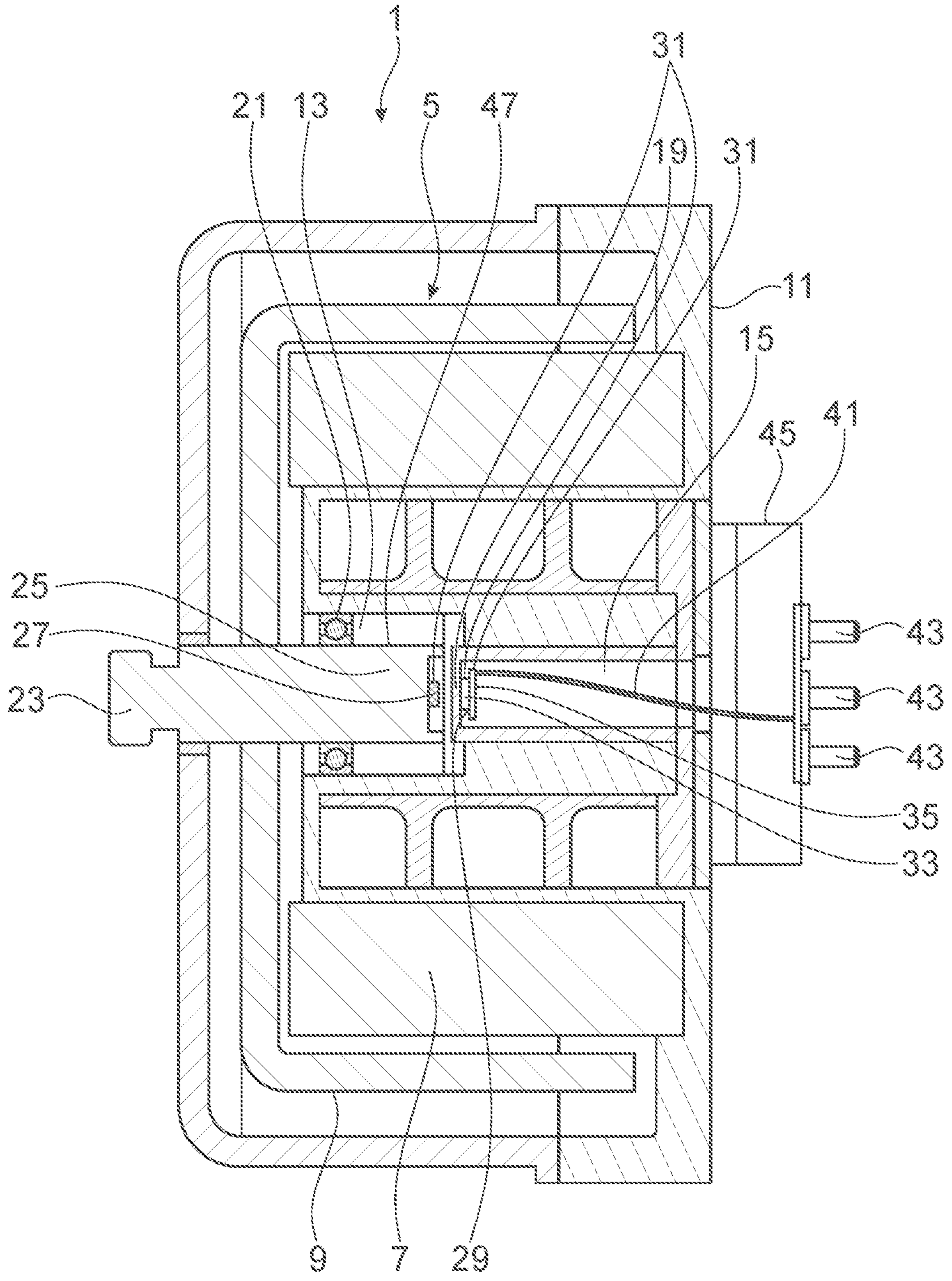
FIG. 2 shows a schematic sectional representation through another exemplary embodiment of an electric motor arrangement.

FIG. 2 shows a schematic sectional representation through another exemplary embodiment of an electric motor arrangement 1, as is able to be used in the field of vehicles, for example. Use in a fan is conceivable for this electric motor arrangement 1 too. Alternative fields of use are a drive, for example for a hydraulic pump. Another field of use is a compressor in an electrically driven or assisted charger, for example for a fuel cell.

The discussion below focuses on differences over the previous exemplary embodiment, structural differences in the electric motor 5 and the multipartite housing 11 already being clearly identifiable in the drawing.

The electric motor arrangement 1 comprises a multipartite housing 19 in which a rotor 9 and a stator 7 are arranged. In this exemplary embodiment, the rotor 9 comprises a bell-shaped external rotor and a rotor shaft 47, which extends in the stator 7 only in a front region of the housing 19. The external rotor extends beyond the end region on the rotor shaft 47, on which the magnet 27 is arranged, in the axial direction. A first end region 23 of the rotor 9 protrudes from the housing 19 and may be connected to another component, not shown in FIG. 2, which is intended to be rotated. By way of example, such a component may be a fan wheel, a compressor wheel or a gear. A magnet 27 is arranged on the rotor shaft 47 on the end face of the opposite, second end region 25 of the rotor 9.

In this exemplary embodiment, the circuit region 15, as a housing chamber, also extends cylindrically from a rear housing region into a central region of the electric motor arrangement 1. The cylindrical housing part 12 juts as far as the end face of the rotor shaft to which the magnet 27 is fitted. The rotor region 13 and the circuit region 15 are separated by a housing wall 19 that is faced by the magnet 27. In this exemplary embodiment, a control circuit 17 for supplying power to and controlling the electric motor 5 is not provided in the circuit region 15, however, but rather externally.

The magnet 27 and the magnetic field sensor apparatus 29 form a sensor arrangement 31 that is arranged on both sides of the housing wall 19 and allows angular position detection by the housing wall 19 by detecting the magnetic field that penetrates the housing wall.

This exemplary embodiment is a remote arrangement in which the control circuit (not shown in FIG. 2) is provided externally. By way of illustration, there is provision on the back of the electric motor arrangement 1 for three pin-shaped contacts 43 by means of which the electric motor 5 and the sensor arrangement 31 may be externally controlled and supplied with power. The contacts 43 jut from a region formed on the back of the housing 19 as a connector 45.

The sensor arrangement 31 comprises the magnet 27 and Hall sensors 33, which a magnetic field sensor apparatus 29 arranged in the circuit region 15 comprises. Arranged between these components 27, 29 is the housing wall 19, which separates the rotor region 13 from the circuit region 17 in a liquid-tight manner. The magnetic field sensor apparatus 29 is mounted on the housing wall 19 on the side of the housing wall 19 that is remote from the rotor 9. A cable connection 41 that runs through the circuit region 15 electrically connects the Hall sensors 33 to the contacts 43.

The features indicated above and those indicated in the claims, and also the features that can be extracted from the figures, are advantageously realizable either individually or in different combinations. The invention is not limited to the exemplary embodiments described, but rather is modifiable in many ways within the scope of ability of those skilled in the art.

REFERENCE SIGNS

1 electric motor arrangement
3 fan wheel adapter
5 electric motor
7 stator
9 rotor
11 housing
12 housing part
13 rotor region
15 circuit region
17 control circuit
19 housing wall
21 bearing
23, 25 end region
27 magnet
29 magnetic field sensor apparatus
31 sensor arrangement
33 Hall sensor
35, 37 printed circuit board
39 receptacle
41 cable connection
43 contact
45 connector
47 rotor shaft
51 low-voltage region
53 high-voltage region

What is claimed is:

1. An electric motor arrangement comprising an electric motor, which comprises a rotor, having a sensor arrangement for detecting an angular position of the rotor, which comprises a magnet and a magnetic field sensor apparatus, and comprising a housing, which has a rotor region, in which the rotor is arranged, and a circuit region, which is spatially separated from the rotor region by a housing wall and in which the magnetic field sensor apparatus is arranged, wherein the rotor comprises an end region, facing the housing wall, containing the magnet, wherein the magnetic field sensor apparatus is configured to detect a magnetic field of the magnet that penetrates the housing wall and to provide angular position information about the angular position of the rotor, wherein the rotor comprises a bell-shaped external rotor that is external to the stator, and a rotor shaft that extends into the stator and comprises an end face, and wherein the magnet is arranged on the end face of the rotor shaft.

2. The electric motor arrangement as claimed in claim 1, wherein the magnetic field sensor apparatus comprises at least two Hall sensors.

3. The electric motor arrangement as claimed in claim 2, wherein the rotor comprises a rotor shaft, on the end face of which the magnet is arranged, and wherein the magnet is connected to the rotor shaft in a rotationally fixed manner.

4. The electric motor arrangement as claimed in claim 3, wherein the magnetic field sensor apparatus and the magnet are spatially separated from one another by the housing wall and arranged adjacently to opposite sides of the housing wall.

5. The electric motor arrangement as claimed in claim 3, wherein at least one of the magnetic field sensor apparatus and the magnet is arranged on a rotation axis of the rotor.

6. The electric motor arrangement as claimed in claim 1, wherein the magnet is connected to the rotor shaft in a rotationally fixed manner.

7. The electric motor arrangement as claimed in claim 1, wherein the housing wall comprises aluminum.

8. The electric motor arrangement as claimed in claim 1, wherein the circuit region is separated from the rotor region in a liquid-tight manner.

9. The electric motor arrangement as claimed in claim 1, wherein the magnetic field sensor apparatus and the magnet are spatially separated from one another by the housing wall and arranged adjacently to opposite sides of the housing wall.

10. The electric motor arrangement as claimed in claim 1, wherein at least one of the magnetic field sensor apparatus and the magnet is arranged on a rotation axis of the rotor.

11. The electric motor arrangement as claimed in claim 1, wherein a supply of electrical power to and control of the sensor arrangement merely comprises a supply of power to and control of the magnetic field sensor apparatus, and is effected in particular by the circuit region.

12. The electric motor arrangement as claimed in claim 1, further comprising a control circuit for the electric motor, which is configured to control a commutation of the electric motor on the basis of the angular position information.

13. The electric motor arrangement as claimed in claim 12, wherein the at least two Hall sensors of the magnetic field sensor apparatus are arranged on a printed circuit board, and wherein the control circuit is arranged on the same printed circuit board or on a further printed circuit board in the circuit region and is electrically conductively connected to the magnetic field sensor apparatus.

14. The electric motor arrangement as claimed in claim 13, wherein the electrically conductive connection to the magnetic field sensor apparatus comprises a cable connection.

15. The electric motor arrangement as claimed in claim 13, wherein the control circuit comprises a high-voltage region and/or a high-current region, the distance of which from the magnet is greater than the distance of the magnetic field sensor apparatus from the magnet.

16. The electric motor arrangement as claimed in claim 15, wherein the magnetic field sensor apparatus is at a shorter distance from a rotation axis of the rotor than the high-voltage region and/or the high-current region.

17. The electric motor arrangement as claimed in claim 12, wherein the control circuit comprises a high-voltage region and/or a high-current region, the distance of which from the magnet is greater than the distance of the magnetic field sensor apparatus from the magnet.

18. The electric motor arrangement as claimed in claim 17, wherein the magnetic field sensor apparatus is at a shorter distance from a rotation axis of the rotor than the high-voltage region and/or the high-current region.

19. The electric motor arrangement as claimed in claim 1, further comprising electrical contacts for externally supplying power to the electric motor arrangement and/or for externally controlling the electric motor arrangement, to which electrical contacts the magnetic field sensor apparatus is electrically conductively coupled.

20. The electric motor arrangement as claimed in claim 1, wherein the bell-shaped rotor surrounds the stator.

* * * * *